US012515214B2

(12) United States Patent
Averbeck et al.

(10) Patent No.: US 12,515,214 B2
(45) Date of Patent: Jan. 6, 2026

(54) WATER SOFTENER SYSTEM AND METHOD OF OPERATING THE SAME

(71) Applicant: A. O. SMITH CORPORATION, Milwaukee, WI (US)

(72) Inventors: David Jeffrey Averbeck, Hartland, WI (US); Guihua Zhou, Elm Grove, WI (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 649 days.

(21) Appl. No.: 17/737,274

(22) Filed: May 5, 2022

(65) Prior Publication Data

US 2022/0410139 A1 Dec. 29, 2022

Related U.S. Application Data

(60) Provisional application No. 63/215,703, filed on Jun. 28, 2021.

(51) Int. Cl.
*B01J 49/85* (2017.01)
*B01J 49/75* (2017.01)
(Continued)

(52) U.S. Cl.
CPC .............. *B01J 49/85* (2017.01); *B01J 49/75* (2017.01); *C02F 1/008* (2013.01); *C02F 1/42* (2013.01);
(Continued)

(58) Field of Classification Search
CPC . B01J 49/85; B01J 49/75; C02F 1/008; C02F 1/42; C02F 2001/425;
(Continued)

(56) References Cited

U.S. PATENT DOCUMENTS 7,651,663 B2   1/2010  Ayala et al.
8,773,149 B2   7/2014  Soecknick et al.
(Continued)

FOREIGN PATENT DOCUMENTS

CN    109319885 A    2/2019
CN    109704440 A    5/2019
(Continued)

OTHER PUBLICATIONS

European Patent Office Action for Application No. 19928631.1 dated Feb. 7, 2025 (6 pages).
(Continued)

*Primary Examiner* — Waqaas Ali
(74) *Attorney, Agent, or Firm* — Michael Best & Friedrich LLP

(57) ABSTRACT

A water softener system includes a brine tank, an ion-exchange resin and a softener control valve fluidly coupling the brine tank and the ion-exchange resin. The softener control valve has an inlet configured to receive a flow of feed-water and an outlet configured to deliver a flow of product water. A flow meter is configured to monitor a flow rate of water to or from the control valve, and a sensor is arranged upstream of the inlet of the softener control valve to measure a fluid property of the flow of feed-water. A controller is configured to calculate an available exchange capacity of the ion-exchange resin using flow rate data from the flow meter and a hardness value of the feed-water, which the controller calculates using a fluid property value from the sensor and a predetermined coefficient. The controller is also configured to initiate a regeneration of the ion-exchange resin using the brine tank and the softener control valve, and to update the predetermined coefficient based at least partially on the calculated available exchange capacity upon initiating the regeneration.

9 Claims, 4 Drawing Sheets

(51) Int. Cl.
*C02F 1/00* (2023.01)
*C02F 1/42* (2023.01)

(52) U.S. Cl.
CPC .. *C02F 2001/425* (2013.01); *C02F 2209/006* (2013.01); *C02F 2209/055* (2013.01); *C02F 2209/40* (2013.01); *C02F 2209/445* (2013.01); *C02F 2303/16* (2013.01)

(58) Field of Classification Search
CPC .......... C02F 2209/006; C02F 2209/055; C02F 2209/40; C02F 2209/445; C02F 2303/16; C02F 1/442; C02F 2209/008; C02F 2209/05; C02F 2307/10; C02F 5/00; C02F 2101/10; C02F 2201/002; B01D 2311/243; B01D 61/027
See application file for complete search history.

(56) References Cited

U.S. PATENT DOCUMENTS

| | | |
|---|---|---|
| 2007/0199900 A1 | 8/2007 | Zimmerman |
| 2008/0047881 A1* | 2/2008 | Buck .............. C02F 1/00 210/85 |
| 2009/0008332 A1 | 1/2009 | Lee et al. |
| 2009/0056422 A1 | 3/2009 | Quinn et al. |
| 2011/0139720 A1* | 6/2011 | Soecknick .......... C02F 1/008 210/687 |
| 2013/0168302 A1* | 7/2013 | Ogai .............. B01J 49/75 210/85 |
| 2022/0194819 A1 | 6/2022 | Zhao et al. |

FOREIGN PATENT DOCUMENTS

| | | |  |
|---|---|---|---|
| DE | 102011003326 A1 | 8/2012 | |
| EP | 2228129 A1 | 9/2010 | |
| EP | 2481713 A1 | 8/2012 | |
| EP | 3366373 A1 | 8/2018 | |
| EP | 2870472 B1 | 9/2018 | |
| JP | 2003004618 A | 1/2003 | |
| JP | 2003220386 A | 8/2003 | |
| KR | 2006-0119226 A | 11/2006 | |
| KR | 100696829 B1 | 3/2007 | |
| KR | 20130112346 A | 10/2013 | |
| WO | 2014150783 A1 | 9/2014 | |
| WO | WO-2016094027 A1 * | 6/2016 | ............. C02F 1/42 |
| WO | WO-2020231436 A1 * | 11/2020 | .......... B01D 61/027 |

OTHER PUBLICATIONS

European Patent Office Partial Supplementary European Search Report for application 19928631.1, dated Oct. 6, 2022 (14 pages).
European Patent Office Extended European Search Report for application 22175657.0, dated Oct. 26, 2022 (10 pages).
European Patent Office Extended European Search Report for application 19928631.1, dated Jan. 10, 2023 (12 pages).
Chinese Patent Office Action for Application No. 201980096317.0, dated Feb. 8, 2023 (22 pages with translation).
Atlas Regeneration Technologies, LLC, "Atlas Regeneration Technologies Products" <atlassensorech.com/products.hmtl> website available at least as early as Aug. 3, 2018 (2 pages).
International Search Report and Written Opinion for Application No. PCT/US2019/032577 dated Jul. 22, 2019 (16 pages).
International Preliminary Report on Patentability and Written Opinion for Application No. PCT/US2019/032577 dated Nov. 25, 2021 (11 pages).
Chinese Patent Office Action for Application No. 202210639840.7 dated Sep. 17, 2025 (22 pages including English machine translation).

* cited by examiner

WATER SOFTENER SYSTEM AND METHOD OF OPERATING THE SAME

FIELD

The present invention relates to systems and methods for using an in-line water hardness sensor and water softener control system.

BACKGROUND

The hardness of water is mainly caused by the presence of calcium and magnesium ions in water. In salt-based water softeners, ion-exchange resins are used to replace the calcium and magnesium ions with sodium ions. When the ion-exchange resin is fresh, it contains a large concentration of sodium ions at its active sites and can produce well-softened water. During usage, sodium ions in the ion-exchange resin are gradually replaced by calcium and magnesium ions and eventually, the resin beads become saturated. At this point the ion-exchange resin is said to be exhausted. When the resin beads have reached exhaustion, the hardness level in product water will greatly increase (referred to as "breakthrough" of the system) and the ion-exchange resin of the water softener must be regenerated using brine.

Monitoring the product water's hardness level is one known method by which a need to regenerate the ion-exchange resin. However, this has certain drawbacks. Currently, most of the commercially available hardness measurement technologies are either based on ion selective electrode (ISE) or ethylenediaminetetraacetic acid (EDTA) titration methods. Those instruments are either very expensive or inconvenient. Therefore, there are few water softener products in the market which use the ISE calcium ion sensor or auto-titrator to control the regeneration process. Those water softeners are expensive and the users must recalibrate the ISE or change the titration reagents frequently to ensure the hardness sensor's reliability.

Initiating regeneration of the ion-exchange media only when an increase in the hardness level of the product water is detected can also have the undesirable effect of subjecting the recipient of the product water to water that has a detectably high level of hardness prior to the regeneration of the media being completed. It is often desirable to regenerate the water softener during periods when a demand for water is not expected to occur, such as during the overnight hours, because any water used during the regeneration process itself will typically not be softened. There is therefore often a period of time between the actual exhaustion of the resin beads and their regeneration, during which time the product water may have an undesirable high hardness level.

It is also desirable to not regenerate the ion-exchange resin too soon, when the resin is still far from being exhausted. Such early regeneration unnecessarily wastes water and salt, both of which are needed to create the brine, and require more frequent refilling of the salt.

SUMMARY

According to an embodiment of the invention, a method of operating a water softener system includes passing feed-water received into the water softener system through an ion-exchange resin to produce product water, and determining a hardness indication value of the product water. A cumulative amount of water that has been passed through the ion-exchange resin since it was last regenerated is monitored, and is used to calculate an available exchange capacity of the ion-exchange resin. The ion-exchange resin is regenerated when either of a first criterion and a second criterion is met.

In at least some embodiments, the first criterion is met when the hardness indication value of the product water exceeds a predetermined limit, and the second criterion is met when the available exchange capacity is less than a predetermined reserve capacity. In some embodiments, the predetermined reserve capacity is equal to zero. In other embodiments, the predetermined reserve capacity is greater than zero.

In some embodiments, the hardness indication value of the product water is determined by using a first and a second conductivity value of the product water. The first conductivity value of the product water is measured, and then a portion of the product water is passed through a filtration membrane. In some embodiments, the filtration membrane is a nanofiltration membrane. The second conductivity value is of the portion of the product water that has passed through the filtration membrane.

In some embodiments, the available exchange capacity of the ion-exchange resin is calculated using a feed-water hardness value. The feed-water hardness value is calculated using a feed-water conductivity value, which is measured prior to softening the water. In at least some such embodiments, the feed-water hardness value is calculated by multiplying the feed-water conductivity value by a coefficient.

In some embodiments, a coefficient used to calculate the feed-water hardness value is updated when the first criterion or the second criterion is met. In some such embodiments, updating the coefficient results in the calculated feed-water hardness value decreasing when the second criterion is met but the first criterion is not met. In some such embodiments, updating the coefficient results in the calculated feed-water hardness value increasing when the first criterion is met but the second criterion is not met.

In some embodiments, calculating the available exchange capacity of the ion-exchange resin includes calculating an estimated used exchange capacity using the feed-water hardness value and the cumulative amount of water. The available exchange capacity can be calculated by subtracting the estimated used exchange capacity from a predetermined total exchange capacity of the ion-exchange resin.

In some embodiments, the estimated used exchange capacity is compared to a stored value of a previous used exchange capacity. The stored value can have been calculated prior to the last regeneration of the ion-exchange resin. After determining that the estimated used exchange capacity is less than the stored value by at least a threshold amount, an error message is delivered. The error message can, in at least some embodiments, be a message indicating that a brine tank of the water softener system needs to be refilled with salt. The error message can also or alternatively be a message indicating that a faulty regeneration has occurred.

In at least some embodiments, the estimated used exchange capacity is compared to the stored value and a determination is made whether the estimated used exchange capacity is less than the stored value by at least a first threshold amount or by at least a second threshold amount that is greater than the first threshold amount. If it is less than the stored value by at least the first threshold amount but it is not less than the stored value by the second threshold amount, then a first error message is delivered. If it is less than the stored value by at least the second threshold amount, then a second error message is delivered. In some embodiments, the first error message is a message indicating that the brine tank needs to be refilled with salt. In some embodiments, the second error message is a message indicating that a faulty regeneration has occurred According to another embodiment of the invention, a water softener system includes a brine tank, an ion-exchange resin and a softener control valve fluidly coupling the brine tank and the ion-exchange resin. The softener control valve has an inlet configured to receive a flow of feed-water and an outlet configured to deliver a flow of product water. A flow meter is configured to monitor a flow rate of water to or from the control valve, and a sensor is arranged upstream of the inlet of the softener control valve to measure a fluid property of the flow of feed-water. A controller is configured to calculate an available exchange capacity of the ion-exchange resin using flow rate data from the flow meter and a hardness value of the feed-water, which the controller calculates using a fluid property value from the sensor and a predetermined coefficient. The controller is also configured to initiate a regeneration of the ion-exchange resin using the brine tank and the softener control valve, and to update the predetermined coefficient based at least partially on the calculated available exchange capacity upon initiating the regeneration.

In at least some embodiments, the controller is configured to initiate regeneration of the ion-exchange resin when the calculated available exchange capacity is less than a predetermined reserve capacity. In some such embodiments, the controller is configured to monitor a water usage history of the water softener system using the flow rate data, and to determine the reserve capacity using the water usage history.

In some embodiments, the water softener system includes a water hardness monitoring system arranged downstream of the outlet of the softener control valve. The controller can be configured to receive fluid property data of the product water from the water hardness monitoring system, and to calculate a hardness indication value of the product water using that fluid property data.

In at least some embodiments, the controller is configured to determine whether a first regeneration criterion is met, and to determine whether a second regeneration criterion is met. The controller is configured to initiate the regeneration of the ion-exchange resin when either of the first criterion and the second criterion is met. The first criterion can be determined to be met when the calculated hardness indication value of the product water exceeds a predetermined limit. The second criterion can be determined to be met when the calculated available exchange capacity is less than a predetermined reserve capacity.

In at least some embodiments, the controller is configured to update the predetermined coefficient when exactly one of the first and second regeneration criteria is met. In some embodiments, the controller is configured to update the predetermined coefficient so as to increase the calculated feed-water hardness value when the first regeneration criterion is met but the second regeneration criterion is not met. In some embodiments, the controller is configured to update the predetermined coefficient so as to decrease the calculated feed-water hardness value when the first regeneration criterion is not met but the second regeneration criterion is met.

In some embodiments, the water hardness monitoring system includes a filtration line in fluid communication with the outlet of the softener control valve to divert product water into the water hardness monitoring system, and an exit line. The water hardness monitoring system also includes a filtration membrane with an upstream side fluidly coupled to the filtration line and a downstream side fluidly coupled to the exit line. A conductivity sensor is arranged along the exit line. In some embodiments, a valve is arranged hydraulically in parallel with the filtration membrane between a point along the filtration line and a point along the exit line upstream of the conductivity sensor. In some embodiments, a second conductivity sensor is arranged along the filtration line.

In some embodiments of the invention, the controller is also configured to calculate an estimated used exchange capacity using the flow rate data and the hardness value of the feed-water, and to compare the estimated used exchange capacity to a stored value of a previous used exchange capacity. The controller is configured to determine whether the estimated used exchange capacity is less than the stored value by at least a threshold amount, and to deliver an error message when the estimated used exchange capacity is less than the stored value by at least the threshold amount. In some such embodiments, the error message is a message indicating that a brine tank of the water softener system needs to be refilled with salt. In some such embodiments, the error message is a message indicating that a faulty regeneration has occurred. The controller can be configured to deliver different error messages based on the amount by which the estimated used exchange capacity is less than the stored value.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The present invention relates to a system and method of monitoring the effectiveness of a water softener in softening water. The water softener in the present invention uses an ion-exchange resin, which softens water by removing ions that contribute to water hardness, such as calcium and magnesium, and replacing the ions with sodium to generate softened product water. The water softener system employs a water hardness monitoring system to continuously or periodically check the non-sodium ion content of the product water. A rise in non-sodium ion content downstream of the bed of ion-exchange resin is an indication that the ion-exchange resin is losing its ability to soften the water.

Figure 1:
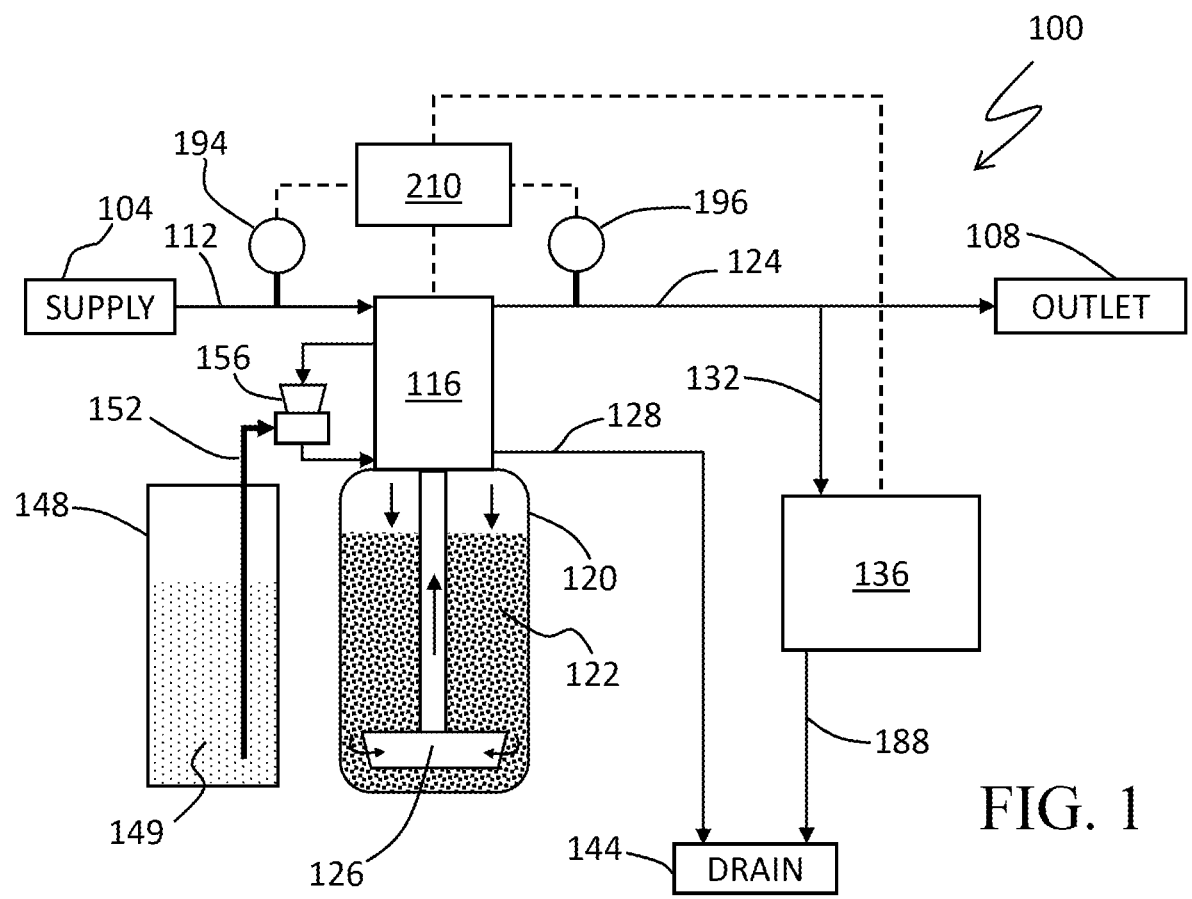
FIG. 1 is a schematic representation of a water softener system according to an embodiment of the present invention.

FIG. 1 schematically depicts a water softener system 100 according to one embodiment of the present invention. The system 100 receives water (called "feed water") from a water supply (e.g., a raw water supply) 104 which may be a municipal water supply, a well or any other typical source of potable water, and delivers clean, softened product water to a potable water output device such as a faucet, or exit port, 108. The feed water may be provided under typical head pressures for water supply systems. The water supply 104 and faucet 108 are illustrated schematically and are intended to include any water inlet and any water outlet of the system 100.

The water softener system 100 includes: a feed line 112, a softener control valve 116, an ion-exchange reactor 120, a softened water line 124, a brine drain line 128, a filtration line 132, a water hardness monitoring system 136, a drain line 140, a drain 144, a brine tank 148, a brine supply line 152, a brine delivery system 156, a feed water fluid property sensor 194, a flow meter 196, and a control system 200 (FIG. 2) including a controller 210.

With continuing reference to FIG. 1, the feed line 112 communicates between the water supply 104 and the softener control valve 116. The softener control valve 116 is positioned upstream of the ion exchange reactor 120 and directs the feed water to flow into the ion exchange reactor 120 when the water softening system 100 is in a softening mode. The softener control valve 116 is in communication with the controller 210, which emits a signal (wired or wirelessly) to the softener control valve 116 to direct the flow of water into the ion exchange reactor 120.

The ion-exchange reactor 120 includes an upstream side communicating with the feed line 112 and the brine delivery system 156 and a downstream side communicating with the softened water line 124 and the brine drain line 128. The ion-exchange reactor 120 houses a bed of ion-exchange resin 122, which removes impurities that contribute to water hardness, such as small dissolved solids and ions (e.g., calcium, magnesium), thereby creating softened product water that is delivered to the softened water line 124. The ion exchange reactor 120 additionally includes a distributor system 126 in connection with the softener control valve 116. The distributor system 126 provides a water connection to the bottom of the ion exchange reactor 120. The distributor system 126 includes a screen operable to prevent resin 122 from being washed out of the reactor 120. Feed water passes down through the bed of ion-exchange resin 122 to be softened, then through the distributor system 122 as softened water, back up to the downstream side of the control valve 116, and out through the softened water line 124.

The brine tank 148 may take the form of any receptacle or vessel which can store brine (e.g., sodium ions) for recharging the ion-exchange resin 122. In this regard, the term "tank" is intended to be a very broad term encompassing all such receptacles and vessels. The brine in the brine tank 148 may be generated, for example, from salt 149 immersed in water in the brine tank 148. As will be discussed below, each regeneration cycle of the reactor 120 depletes the salt 149 in the brine tank 148. The brine tank 148 is controlled by the controller 210. More specifically, the controller 210 emits a signal to close the softener control valve 116 and actuates the brine delivery system 156 (e.g., opens a valve within the brine delivery system 156), thereby directing a flow of brine to the ion-exchange reactor 120 via the brine supply line 152. Brine moves through the brine supply line 152 via the brine delivery system 156, which provides a motive force or pressure to move the brine out of the tank 148 and into the reactor 120 when the ion-exchange resin 122 needs to be regenerated. The motive force or pressure may be provided by, for example, head pressure, an eductor, or a pump. The brine supply line 152 communicates with the brine tank 148 and the ion-exchange reactor 120. In some modes of operation, a user may manually actuate the brine tank 148 to supply a flow of brine to the ion-exchange reactor 120.

When the brine flows through the bed of ion-exchange resin 122, the hard water ions (e.g. calcium, magnesium, and the like) that have been adsorbed onto the ion-exchange resin are replaced by sodium ions, which are at a high concentration in the brine. The brine, along with the displaced hard water ions, is directed by the softener control valve 116 into the brine drain line 128, whereby it is delivered to a drain 144. Eventually, all of the hard water ions will have been replaced by sodium ions, and the ion-exchange resin is then considered to have been regenerated. The water softener system 100 will then again be ready to operate in the softening mode.

The water hardness monitoring system 136 is in communication with the controller 210, and provides information to the controller 210 to enable the calculation of a water hardness value of the product water. While the water hardness monitoring system 136 can take several forms, some exemplary versions of a water hardness monitoring system 136 that is especially suitable for use in the water softener system 100 will be described with reference to FIG. 3. As depicted therein, the exemplary water hardness monitoring system 136 includes a nanofiltration membrane 160.

The nanofiltration membrane 160 has different permeabilities to monovalent ions (e.g., $Na^+$, $K^+$, etc.) and polyvalent ions (e.g., $Ca^{2+}$, $Mg^{2+}$, etc.). As one non-limiting example, the nanofiltration membrane 160 can be a FILMTEC™ NF270 membrane available from The Dow Chemical Company, which has a higher permeation rate for polyvalent ions than for monovalent ions. When the ion-exchange resin 122 is effectively softening the water, then the product water will be substantially absent of any polyvalent ions, those having been exchanged in the ion-exchange reactor for monovalent ions. Water that permeates through the nanofiltration membrane 160 (referred to as "permeate") will have a substantially lower concentration of monovalent ions, as those are substantially prevented from passing through the nanofiltration membrane.

Figure 2:
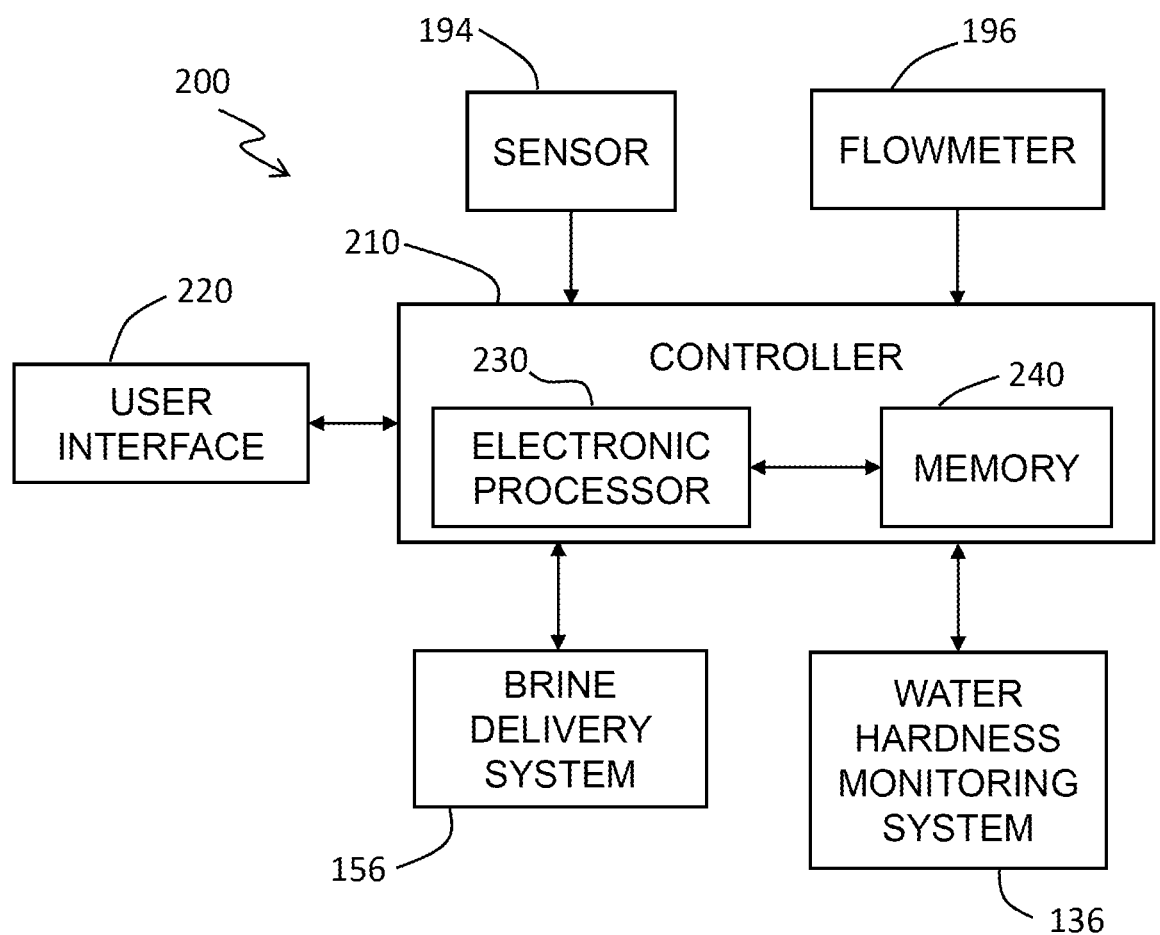
FIG. 2 is a representation of a control system for use with the water softener system of FIG. 1.

The water hardness monitoring system 136 further includes a permeate line 164, a sensor 172, a main solenoid valve 176, a flow restrictor 180, and an exit line 188. As will be further described, the water hardness monitoring system optionally includes a sensor 198, a bypass line 168, and a bypass solenoid valve 184. With reference to FIG. 2, the control system 200 includes control logic to coordinate operation of the various components.

The main solenoid valve 176 selectively places the water hardness monitoring system 136 in fluid communication with the drain 144. When the main solenoid valve 176 is closed, backpressure develops in the water hardness monitoring system 136 and no water from the softened water line 124 can be diverted into the water hardness monitoring system 136. But when the main solenoid valve 176 is opened, product water can be diverted from the softened water line 124 into the water hardness monitoring system 136 through the filtration line 132 that connects the water monitoring system 136 to the softened water line 124.

When the main solenoid valve 176 is open, the water hardness monitoring system 136 measures the conductivity of the product water, and of the permeate. If the ion-exchange resin 122 is effectively softening the water, the conductivity of the product water should mainly arise from the presence of sodium ions in the softened water. That being the case, the conductivity of the permeate should be very low compared to the conductivity of the product water.

The nanofiltration membrane 160 includes an upstream side 160a communicating with the filtration line 132, a downstream side 160b communicating with the permeate line 164, and a drain port 160c communicating with the drain line 140. The permeate line 164 communicates with the exit line 188. The flow restrictor 180 is positioned in the drain line 140 to restrict the flow of water on the upstream side of the nanofiltration membrane. This thereby creates backpressure on the upstream side 160a of the nanofiltration membrane 160, causing some water to permeate through the nanofiltration membrane 160 and out the downstream side 160b. This permeate is delivered to the permeate line 164 on the downstream side 160b of the nanofiltration module 160. Specifically, the permeate line 164 communicates between the downstream side 160b of the nanofiltration membrane 160 and the exit line 188. The conductivity of the permeate is measured by the sensor 172 in the exit line 188, and is communicated to the controller 210.

Figure 3:
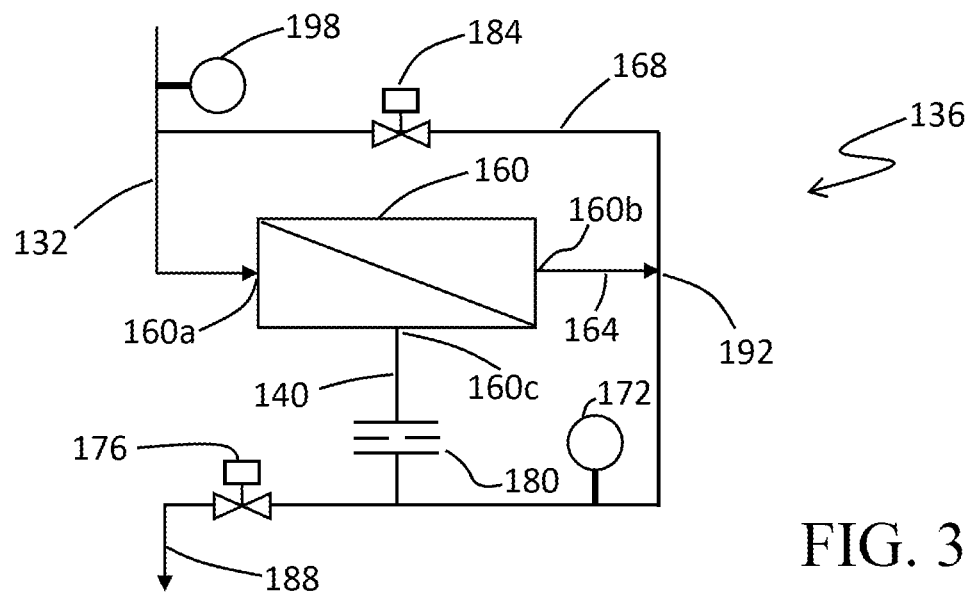
FIG. 3 is a schematic representation of a water hardness monitoring system for use in the water softener system of FIG. 1.

The water hardness monitoring system 136 is additionally configured to measure the conductivity of the product water received through the filtration line 132. In some embodiments, an additional sensor 198 is provided in the filtration line 132 in order to measure the product water conductivity. In other embodiments, the sensor 172 can be used to measure both the conductivity of the permeate and the conductivity of the product water, so that the additional sensor 198 can be eliminated. In one such embodiment, a bypass line 168 including a bypass solenoid valve 184 is placed hydraulically in parallel with the filtration membrane 160 between the filtration line 132 and the exit line 188, as shown in FIG. 3.

When closed, the bypass solenoid valve 184 forces the softened water to flow through the nanofiltration module 160, the flow restrictor 180, and to the drain 144 through the exit line 188 and main solenoid valve 176. When the bypass solenoid valve 184 is open, a path of less resistance to the drain 144 is available through the bypass line 168, exit line 188, and main solenoid valve 176. The bypass line 168 is a path of less resistance because of the backpressure created by the flow restrictor 180 and nanofiltration module 160. By opening and closing the path of less resistance (i.e., the bypass line 168), the bypass solenoid valve 184 can direct the flow of product water through the nanofiltration membrane 160 or through the bypass line 168 (i.e., around the nanofiltration membrane 160). The bypass solenoid valve 184 is in wired or wireless communication with the controller 210, which emits a signal to the bypass solenoid valve 184 to direct the flow of product water through the nanofiltration membrane 160 or around the nanofiltration membrane 160 by way of the bypass line 168. The bypass line 168 and the permeate line 164 merge at a junction 192, which initiates the exit line 188.

The sensor 172 is in the exit line 188 downstream of the junction 192 and electronically communicates by wire or wirelessly with the controller 210 to monitor the conductivity of the water in the exit line 188. The water in the exit line 188 may be product water or permeate depending on the settings of the bypass solenoid valve 184. The main solenoid valve 176 is positioned in the exit line 188, downstream of the sensor 172, to direct water flowing from the exit line 188 to the drain 144.

When the water passes through the sensor 172 (or the sensor 198, if present), the sensor determines a conductivity value of the water and communicates (either via wires or wirelessly) the conductivity value to the controller 210. The controller 210 then records the conductivity value as a first conductivity value C1 (if product water from the sensor 198 or the bypass line 168) or a second conductivity value C2 (if permeate from the permeate line 164). The conductivity of the product water arises from impurities (e.g., total dissolved solids including but not limited to sodium ions, calcium ions, and magnesium ions) in the product water. Because sodium ions are effectively removed from the water by the nanofiltration membrane, the conductivity of the permeate arises mainly from the presence of divalent ions such as calcium and magnesium ions (i.e., not impurities or monovalent ions such as sodium ions which would be filtered by the nanofiltration membrane).

Although preferably positioned immediately downstream of the nanofiltration module 160, the sensor 172 can be positioned anywhere along the exit line 188. In at least some embodiments, the sensor 172 is a conductivity sensor or total dissolved solids (TDS) sensor, but other types of sensors can be used to sense TDS concentration of the softened water or the permeate. The sensor 172 (and the sensor 198, if provided) may be separately removable from the system 100, allowing the sensor to be individually replaced in the event of damage. If the water hardness monitoring system 136 includes the conductivity sensor 198, then the bypass solenoid valve 184 and bypass line 168 can be eliminated from the system 136 so that product water entering the water hardness monitoring system 136 must flow through the nanofiltration membrane 160.

The water hardness monitoring system 136 permits the control system 200 to monitor and compare conductivity of the softened water and conductivity of the permeate to determine whether there has been breakthrough in the ion-exchange resin 122. More specifically, the sensor 172 communicates the first and second conductivity values C1, C2 to the controller 210. The controller 210 calculates a hardness value of the product water, or an indicator of a change in hardness of the product water, using the first and second conductivity values. By way of example, the controller 210 can be configured to calculate a salt passage rate using the first and second conductivity values C1, C2. The salt passage rate can be calculated as the ratio of the conductivity of the permeate C2 to the conductivity of the product water C1. This ratio, which is less than one, will become larger (i.e., approach 1) as conductivity becomes more and more attributable to non-sodium ions due to breakthrough of the resin 122 in the ion exchange reactor 120.

A change in the salt passage rate signifies a change in water hardness. As the ion-exchange resin 122 experiences breakthrough, the hardness of the product water increases from zero and the second conductivity value C2 increases. For example, if the ion-exchange resin 122 is completely exhausted, the hardness of the product water will be equal to the hardness of the feed water, because none of the polyvalent ions are being replaced with sodium ions. The conductivity C1 of the product water will not, however, experience much change since the concentration of total dissolved solids will remain unchanged. In contrast, the conductivity value C2 of the permeate will increase to a value equal to or only slightly below C1, because the nanofiltration membrane will not substantially block the polyvalent ions. As a result, the salt passage rate substantially increases (e.g., becomes closer to 1). A change in the salt passage rate (for example, a percent deviation of salt passage rate from a baseline value determined immediately or shortly after a regeneration) can therefore be used as a numerical indicator for product water hardness. When that indicator of product water hardness exceeds a limit, the controller 210 will determine that the ion-exchange resin 122 has experienced significant breakthrough and needs to be regenerated, and can automatically regenerate the ion-exchange resin 122 in response.

It should be understood by one of skill in the art that the first and second conductivity values C1 and C2 can be mathematically combined in various ways to infer that the product water hardness is increasing due to resin breakthrough. By way of example, a hardness value of the product water can be calculated from the values C1 and C2 as described in Patent Cooperation Treaty patent application no. PCT/US2019/032577, the contents of which are incorporated herein in their entirety. For clarity, any such calculation that uses the first and second conductivity values to infer an indication of hardness of the product water will be referred to herein as calculating a hardness indication value ($H_S$) of the product water.

The water softening system 100 additionally includes a sensor 194 arranged along the feed line 112 to measure a fluid property of the feed water, and a flow meter 196. As depicted in FIG. 1, the flow meter 196 is located along the softened water line 124, but alternatively it can be located along the feed line 112. Both the sensor 194 and the flow meter 196 are in communication with the controller 210 and deliver information to the controller 210. The flow meter 196 is used to measure a volumetric flow rate of product water through the water softening system 100. The controller receives the volumetric flow rate information from the flow meter 196, and uses that data to determine a cumulative volumetric flow of water that has passed through the ion-exchange reactor 120 since the last regeneration of the ion-exchange resin 122.

The controller 210 uses information received from the sensor 194 to calculate the hardness of the feed water. In one exemplary embodiment, the sensor 194 measures the conductivity $C_F$ of the feed water, and the controller uses stored coefficients to convert the conductivity into a hardness value $H_F$ of the feed water, using the following equation, where the coefficients g and h are predetermined constants:

$$H_F = C_F g + h$$

In other embodiments, the relationship between conductivity of the feed water and hardness of the feed water can be other than a linear relationship, such as a second-order (or higher) relationship.

When the faucet 108 is opened, water moves from the water supply 104 through the ion-exchange reactor 120 via the feed line 112 under the influence of head pressure in the water supply 104 (which is higher than the atmospheric pressure at the faucet 108). Impurities and divalent ions remain in the reactor 120 until the resin 122 is regenerated, at which point the impurities and divalent ions are routed directly to the drain 144 via the brine drain line 128. Softened product water flows toward the faucet 108 via the softened water line 124.

The controller 210 sends a signal to the main solenoid valve 176 to open when product water is to be diverted into the water hardness monitoring system 136. Product water flows through the nanofiltration membrane 160 when the bypass solenoid 184, if present, is closed. Impurities caught in the upstream side 160*a* of the nanofiltration module 160 are routed directly to the drain 144 via the drain port 160*c* and the drain line 140. Permeate flows out of the downstream side 160*b* of the nanofiltration module 160 via the permeate line 164 toward the junction 192. If the sensor 172 is also being used to measure the product water conductivity, the controller 210 sends a signal to the bypass solenoid 184 to open when it is desired to have product water bypass the nanofiltration membrane 160 via the bypass line 168 to the junction 192.

The sensors 172, 198 determine the conductivity value of the water (whether it be product water or permeate) and stores the conductivity value as a first conductivity value C1 (if product water) or a second conductivity value C2 (if permeate from the permeate line 164). The water then continues along the exit line 188, exits the system 100, and flows into the drain 144. Preferably, the main solenoid valve 176 is only opened during times when a demand for water at the outlet 108 is not expected. For example, the main solenoid valve 176 can be opened on a daily cycle, during the overnight hours when demand is not expected.

As shown in FIG. 2, the control system 200 includes the controller 210 and an optional user interface 220. According to one exemplary construction, the controller 210 includes a plurality of electrical and electronic components that provide power, operational control, and protection to the components and modules within the controller 210. For example, the controller 210 includes, among other things, an electronic processor 230 (e.g., a microprocessor, a microcontroller, or another suitable programmable device) and a memory 240. The controller 210 communicates by wire or wirelessly with various input units such as the flow meter 196, the sensor 194, the sensor(s) of the water hardness monitoring system 136, etc. and various output units such as the solenoid valve(s) of the water hardness monitoring system 136, the brine delivery system 156, etc.

The memory 240 includes, for example, a program storage area and a data storage area. In some constructions, the memory may be storage space in the cloud. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. With continued reference to FIG. 2, the electronic processor 230 is connected to the memory 240 and executes software instructions that are capable of being stored in RAM (e.g., during execution), ROM (e.g., on a generally permanent basis), or another non-transitory computer readable medium such as another memory or a disc. Software included in the implementation of the water hardness monitoring system 136 can be stored in the memory 240 of the controller 210. The software includes, for example, firmware, one or more applications, program data, filters, rules, one or more program modules, and other executable instructions. The controller 210 retrieves from memory 240 and executes, among other things, instructions related to the control processes and methods described herein. In other constructions, the controller 210 includes additional, fewer, or different components.

The optional user interface 220 may be used to control or monitor the water softener system 100. The user interface 220 includes a combination of digital and analog input or output devices required to achieve a desired level of control and monitoring for the water softener system 100. For example, the user interface 220 includes a display (e.g., a primary display, a secondary display, etc.) and input devices such as touch-screen displays, a joystick, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface 220 can also be configured to display conditions or data associated with the water softener system 100 in real-time or substantially real-time. For example, the user interface 220 can be configured to display measured electrical characteristics of the water softener system 100 and the status of the water softener system 100. In some implementations, the user interface 220 is controlled in conjunction with the one or more indicators (e.g., LEDs, speakers, etc.) to provide visual or auditory indications of the status or condition of the water softener system 100. The optional user interface 220 may be a smartphone running an application configured to communicate with the control system 200.

Figure 4:
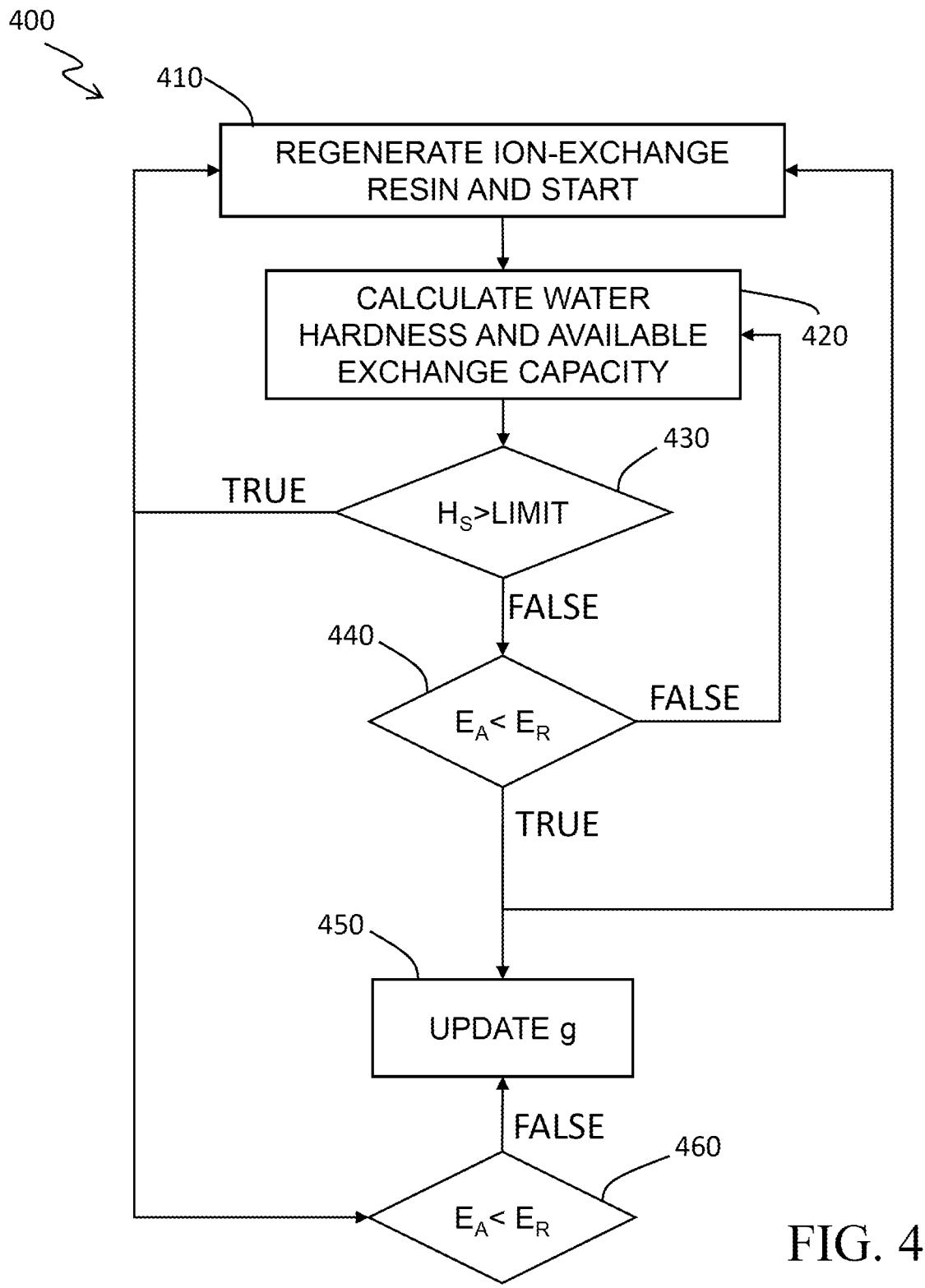
FIG. 4 is a flowchart of a process according to some embodiments of the invention.

FIG. 4 illustrates a process 400 of automatically regenerating the ion-exchange resin 122 for the system 100. The process 400 begins at step 410 wherein the ion-exchange resin 122 is being regenerated. The controller 210 implements step 410 by opening the valve of the brine delivery system 156 (FIG. 1) positioned between the brine tank 148 and the ion-exchange reactor 120, allowing brine (e.g., salt) to transfer into the ion-exchange resin 122. After completing the regeneration, the process 400 proceeds to step 420.

In step 420, the controller 210 determines a hardness indication value ($H_S$) of the product water (as described previously), and an available exchange capacity ($E_A$) of the ion-exchange resin 122. The available exchange capacity of the ion-exchange resin 122 is calculated by the controller 210 using data received from the flow meter 196 and the sensor 194. As described previously, data received from the sensor 194 can be used by the controller 210 to calculate a hardness value of the feed water ($H_f$). The controller 210 can use the volumetric flow data received from the flow meter 196 to track the cumulative volume of water $Q_p$ that has passed through the ion-exchange resin 122 since the last regeneration of the ion-exchange resin. The available exchange capacity $E_A$ can then be calculated as:

$$E_A = E_M - H_F \times Q_P \times H_C$$

where $E_M$ is the total exchange capacity of the ion-exchange resin immediately after regeneration, and $H_C$ is a proportionality constant. Both $E_M$ and $H_C$ can be known constants that are pre-programmed into the memory 240.

In step 430, the controller 210 determines whether the hardness indication value $H_S$ is greater than a predetermined or threshold limit. Step 430 returns "True" if the hardness indication value $H_S$ is greater than the limit and returns "False" if the hardness indication value $H_S$ is not greater than the limit. The limit value is preferably set to that product water will have a value $H_S$ that reaches the limit with a hardness at which the water is no longer considered to be fully soft, but at which the hardness is not yet noticeable to most people (for example, a hardness of 60 ppm). Step 430 describes a first criterion that, if met, causes the ion-exchange resin to be regenerated. If step 430 returns "True," the logic returns to step 410 in which the controller 210 generates a signal to the brine tank 148 and the brine delivery system 156 to initiate regeneration of the ion-exchange resin 122. Specifically, the controller opens the valve of the brine delivery system 156, allowing brine to transfer to the ion-exchange resin 122. In parallel, the logic proceeds to step 460. If step 430 returns "False," the logic moves to step 440.

In both steps 440 and 460, the controller 210 compares the calculated available exchange capacity $E_A$ to a predetermined reserve capacity $E_R$. The predetermined reserve capacity can be percentage of the total exchange capacity of the ion-exchange resin 122, and can be predetermined by the manufacturer of the water softening system 100, by an installer or end user of the system 100, by the controller 210, or otherwise. Since it is generally desirable to regenerate the ion-exchange resin 122 at times of the day when there is known to be little or no demand for softened water (such as at night time), and it is further desirable to regenerate the ion-exchange resin 122 prior to breakthrough of the resin occurring, the reserve capacity can be set to reflect an ion exchange capacity that is sufficient to soften the amount of water that is expected to be demanded prior to the next opportunity for regeneration of the ion-exchange resin (for example, over the next day). In some embodiments, the controller 210 can track the water consumption patterns over time and can determine the reserve capacity using that water consumption history data.

In some embodiments, the predetermined reserve capacity is set to be equal to a value of zero. For example, in a twin tank system, the controller 210 can switch from one bed of ion-exchange resin to a second available bed of ion-exchange resin immediately upon determine that the first bed is exhausted. Since this will ensure that there is no lack of continuity in the supply of softened water, there is no need to maintain a percentage of the first ion-exchange bed in reserve.

In step 440, if the controller 210 determines that the calculated available exchange capacity $E_A$ is not less than the predetermined reserve capacity $E_R$ (returning a value of "False"), then the logic returns to the step 420. The step 420 will then repeat at the next opportunity for determining whether regeneration of the ion-exchange resin 122 is needed (for example, the next day). If, on the other hand, the controller 210 determines that the calculated available exchange capacity $E_A$ is less than the predetermined reserve capacity $E_R$ (returning a value of "True"), then the logic returns to step 410 in which the controller 210 generates a signal to the brine tank 148 and the brine delivery system 156 to initiate regeneration of the ion-exchange resin 122. Step 440 therefore describes a second criterion that, if met, causes the ion-exchange resin to be regenerated. Although the hardness indication value $H_S$ is not at a value that indicates breakthrough of the ion-exchange resin 122 at that time, the controller 210 has determined that there is not sufficient ion-exchange resin available to prevent breakthrough in the next period of time before regeneration is allowed to occur. In parallel with returning to step 410, the logic also proceeds to step 450 when the controller 210 determines, in step 440, that the calculated available exchange capacity $E_A$ is less than the predetermined reserve capacity $E_R$.

The logic also proceeds to step 450 if the controller determines, in step 460, that the calculated available exchange capacity $E_A$ is not less than the predetermined reserve capacity $E_R$ (returning a value of "False"). Step 460 evaluates the same second criterion that is evaluated in step 440, but does not need to initiate the regeneration of the ion-exchange resin because the regeneration will already have been initiated by meeting the first criterion in step 430 (which must have been met in order for the logic to have proceeded to step 460).

In step 450, the controller 210 updates the value of the coefficient "g" that is used to calculate the feed-water hardness $H_f$. As can be seen from the flow diagram 400, the controller 210 executes step 450 when the first criterion is met (step 430 returns "True") but the second criterion is not met (step 460 returns "False"), or when the first criterion is not met (step 430 returns "False") but the second criterion is met (step 440 returns "True"). In the case where the first criterion is met (step 430 returns "True"), the controller 210 determines that breakthrough of the ion-exchange resin has occurred. The controller will then evaluate (at step 460) whether that breakthrough was expected. If the controller determines that the amount of available exchange capacity (as calculated from the cumulative volume of water that has passed through the reactor 120 since the last regeneration and the calculated feed-water hardness) is not less than the predetermined reserve capacity (i.e. the second criterion is not met), then the breakthrough was not expected. This most likely results from an under-estimation of the feed-water hardness, which can be corrected in step 450 by increasing the value of the coefficient "g", resulting in an increase in the calculated value of the feed-water hardness. If, on the other hand, the controller determines that the amount of available exchange capacity is less than the predetermined reserve capacity, then the breakthrough was expected and the value of the coefficient "g" need not be updated in this iteration of the logic.

In the case where the first criterion is not met (step 430 returns "False"), the controller 210 determines that breakthrough of the ion-exchange resin has not occurred. The controller will then evaluate whether breakthrough is expected to occur over the next cycle period (e.g. the next day). If the controller 210 determines (at step 440) that the amount of available exchange capacity (as calculated from the cumulative volume of water that has passed through the reactor 120 since the last regeneration and the calculated feed-water hardness) is less than the predetermined reserve capacity (i.e. the second criterion is met), then breakthrough is expected to occur over that next cycle period. However, if the calculated feed-water hardness is substantially higher than the actual feed-water hardness, then this expectation will be in error and the controller will be regenerating the ion-exchange resin unnecessarily early, wasting both water and salt. The controller 210 can correct for such a potential result in step 450 by decreasing the value of the coefficient "g", resulting in a decrease in the calculated value of the feed-water hardness.

In successive cycles of the process 400, the value of the coefficient "g" can be reduced until the calculated feed-water hardness value approximately matches the actual feed-water hardness value. If, through reducing the value of "g", the calculated feed-water hardness becomes too low, then the controller 210 will be over-estimating the available exchange capacity and the next regeneration will be triggered by the first criterion being met. As described above, this will result in the value of the coefficient "g" being increased if the controller determines, in step 460, that the feed-water hardness is being under-calculated. The process 400 can thereby be used to iteratively error-correct the feed-water hardness calculation.

In the illustrated embodiment, the ion-exchange resin 122 is automatically regenerated via the controller 210. In alternative embodiments, the controller 210 may alert the user that the ion-exchange resin 122 needs to be regenerated via the user interface 220. The user may then manually open the valve of the brine delivery system 156 and actuate the brine tank 148 in order to regenerate the ion-exchange resin 122.

Figure 5:
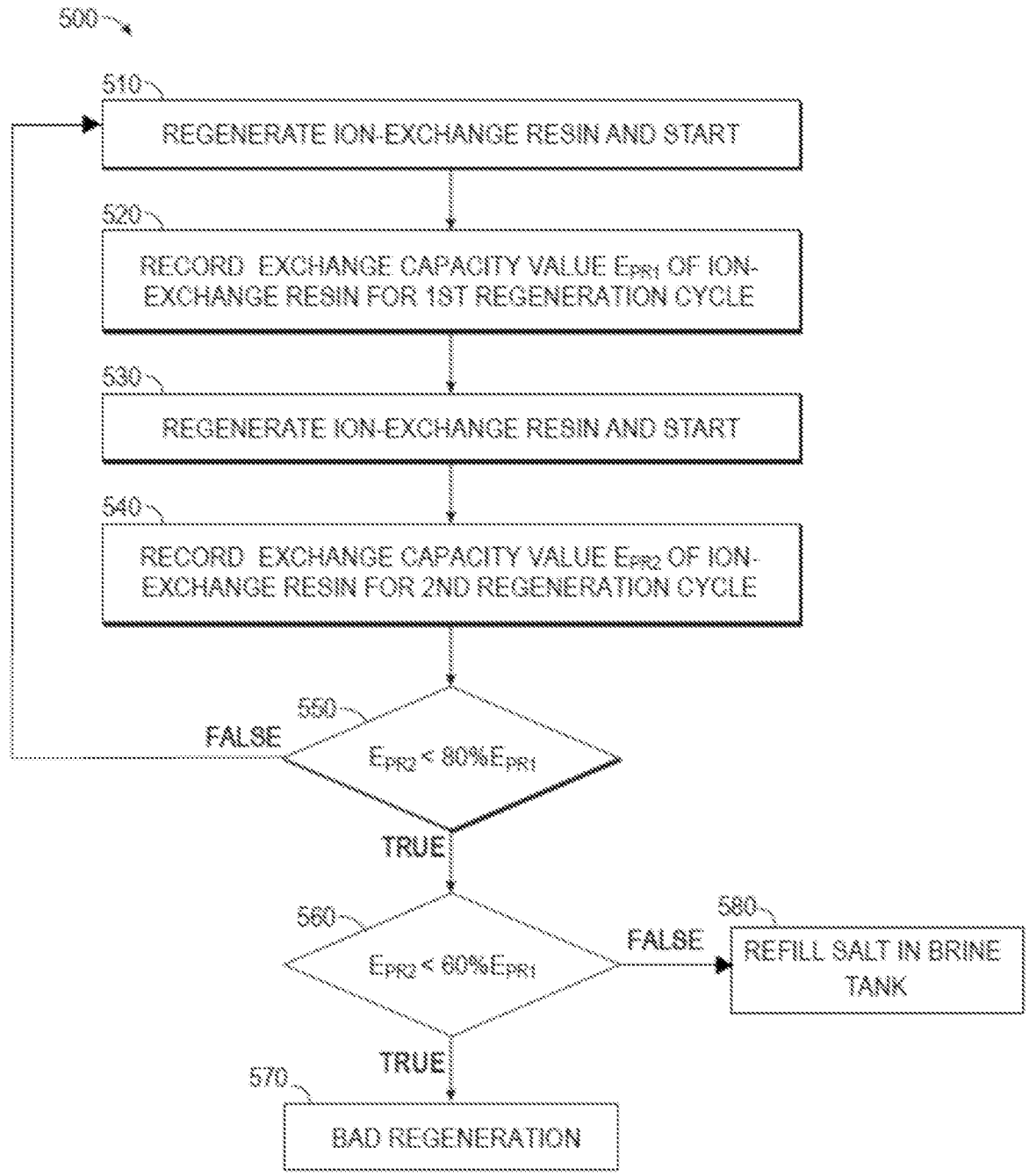
FIG. 5 is a flowchart of a process according to some embodiments of the invention.

The controller 210 can also use the volumetric flow rate data received from the flow meter 196 to monitor the brine tank 148. FIG. 5 displays a process 500 of determining when the brine tank 148 needs to be refilled with salt. Each time the brine tank 148 regenerates the ion-exchange resin 122, salt 149 in the brine tank 148 is fractionally depleted. After multiple regeneration cycles, the brine tank 148 may become so depleted of salt that the brine solution is no longer saturated and the brine tank 148 needs to be manually refilled with salt. The process 500 begins at step 510 wherein the ion-exchange resin 122 is new or has just been regenerated (e.g., with brine from the brine tank 148). In step 520, the controller 210 implements the following calculation to determine an exchange capacity value $E_p$ of the ion-exchange resin 122 for the current cycle (e.g., for a period of time p).

$$E_P = Q_P \times H_S$$

As previously stated, $H_S$ is the calculated hardness indication value of the product water. $Q_P$ is the volume of water (e.g., measured in gallons) softened over the time period p, as measured by the flow meter 196. The exchange capacity value $E_P$ is a value indicative of the total of active sites responsible for ion-exchange within the ion-exchange resin 122 that have been exhausted during the time period p.

The controller 210 monitors the exchange capacity value Ep and continuously determines a cumulative exchange capacity value $Ep_R$, which is a sum of all previous exchange capacity values Ep since the last regeneration cycle. The controller 210 records the exchange capacity value $Ep_R$ for the current cycle as $Ep_{R1}$. In step 530, the controller 210 automatically opens the valve of the brine delivery system 156 and actuates the brine tank 148, allowing brine from the brine tank 148 to regenerate the ion-exchange resin 122.

In step 540, the controller 210 again monitors the exchange capacity value $Ep_R$ of the ion-exchange resin 122. The controller 210 records the exchange capacity value $Ep_R$ of the ion-exchange resin 122 for the second regeneration cycle and records the exchange capacity value $Ep_R$ as $Ep_{R2}$.

In step 550, the controller 210 compares the second exchange capacity value $Ep_{R2}$ to the first exchange capacity value $Ep_{R1}$ to determine degradation of system performance (in terms of available exchange capacity) following the regeneration in step 510 and the regeneration in step 530. Step 550 returns "True" if the exchange capacity value of the ion-exchange resin 122 following the regeneration in step 530 (i.e., the second exchange capacity value $Ep_{R2}$) is less than or equal to a predetermined percentage of the exchange capacity value of the ion-exchange resin 122 following the regeneration in step 510 (i.e., the first exchange capacity value $Ep_{R1}$) and returns "False" if the second exchange capacity value $Ep_{R2}$ is greater than the predetermined percentage of the first exchange capacity value $Ep_{R1}$. The predetermined percentage in the example illustrated in the figures is 80%. However, other predetermined percentages or ranges of percentages may be used depending on the system requirements. If step 550 returns "True," the controller 210 determines that cycle-to-cycle degradation in performance is substantial and the logic moves to step 560. If step 550 returns "False," the logic moves to step 510 and the process 500 starts over.

With continued reference to FIG. 5, the process 500 additionally determines if a failure occurred during the regeneration cycle. In other words, the process 500 determines if the brine tank 148 and brine delivery system 156 have failed to properly regenerate the ion-exchange resin 122, either manually or automatically. A failure may be any occurrence that prevents sufficient regeneration of the ion-exchange resin. For example, a malfunctioning valve within the brine delivery system, a plugged drain line, etc.

In step 560, the controller 210 again compares the second exchange capacity value $Ep_{R2}$ to the first exchange capacity value $Ep_{R1}$ to determine if a failure or "bad regeneration" has occurred. Step 560 returns "True" if the second exchange capacity value $Ep_{R2}$ is less than or equal to a predetermined percentage of the first exchange capacity value $Ep_{R1}$, and returns "False" if the second exchange capacity value $Ep_{R2}$ is greater than the predetermined percentage of the first exchange capacity value $Ep_{R1}$. The predetermined percentage in the example illustrated in the figures is 60%. However, other predetermined percentages or ranges of percentages may be used depending on the system requirements. If step 560 returns "True," the controller 210 determines that cycle-to-cycle degradation in performance is severe, most likely as a result a failure occurring. Therefore, the logic moves to step 570. In step 570, the controller 210 causes a signal to be emitted on the user interface 220 indicating that the ion-exchange resin 122 has not been properly regenerated and the brine tank 148, brine delivery system 156, or softener control valve 116 requires inspection. If step 560 returns "False," the controller 210 determines that the cycle-to-cycle degradation in performance is most likely a result of the brine tank 148 needing to be refilled with salt 149. Therefore, the logic moves to step 580. In step 580, the controller 210 causes a signal to be emitted on the user interface 220 indicating that the brine tank 148 needs to be refilled with salt.

In some embodiments, the controller 210 continually monitors the hardness indication value of the product water for trending patterns in order to determine if a failure has occurred. For example, if the time between subsequent breakthrough events is decreasing and the hardness indication value is steadily rising, the controller 210 may emit a signal on the user interface 220 indicating that the brine tank 148 is running out of salt.

In some embodiments, the controller 210 continually monitors the volume of softened water for trending patterns in order to determine if a failure has occurred. For example, if the total volume of softened water of the current cycle $Q_N$ is less than a predetermined percentage (e.g., 80%) of the total volume of softened water of the previous cycle $Q_{N-1}$, the controller 210 may emit a signal on the user interface 220 indicating that the brine tank 148 is running out of salt.

Various features and advantages of the disclosure are set forth in the following claims.

What is claimed is:

1. A method of operating a water softener system, comprising:
    passing feed-water received into the water softener system through an ion-exchange resin to produce product water;
    determining a hardness indication value of the product water;
    monitoring a cumulative amount of water that has been passed through the ion-exchange resin since a last regeneration of the ion-exchange resin;
    calculating an available exchange capacity of the ion-exchange resin based at least in part on the cumulative amount of water, wherein calculating an available exchange capacity of the ion-exchange resin includes measuring a feed-water conductivity value of the water prior to softening the water and calculating a feed-water hardness value using the feed-water conductivity value, and wherein calculating the feed-water hardness value comprises multiplying the feed-water conductivity value by a coefficient;
    regenerating the ion-exchange resin when either of a first criterion and a second criterion is met, wherein the first criterion is met when the hardness indication value of the product water exceeds a predetermined limit and wherein the second criterion is met when the available exchange capacity is less than a predetermined reserve capacity, and
    updating the coefficient when the first criterion or the second criterion is met.

2. The method of claim 1, wherein determining a hardness indication value of the product water comprises:
    measuring a first conductivity value of the product water;
    passing a portion of the product water through a filtration membrane;
    measuring a second conductivity value of said portion of the product water after having been passed through the filtration membrane; and
    calculating the hardness indication value using the first and second conductivity values.

3. The method of claim 1, wherein updating the coefficient results in the calculated feed-water hardness value decreasing when the second criterion is met but the first criterion is not met, and results in the calculated feed-water hardness value increasing when the first criterion is met but the second criterion is not met.

4. The method of claim 1, wherein calculating the available exchange capacity of the ion-exchange resin further comprises:
    calculating an estimated used exchange capacity using the feed-water hardness value and the cumulative amount of water; and
    subtracting the estimated used exchange capacity from a predetermined total exchange capacity of the ion-exchange resin.

5. The method of claim 4, further comprising:
    comparing the estimated used exchange capacity to a stored value of a previous used exchange capacity, the stored value having been calculated prior to the last regeneration of the ion-exchange resin;
    determining whether the estimated used exchange capacity is less than the stored value by at least a threshold amount; and
    delivering an error message when the estimated used exchange capacity is less than the stored value by at least the threshold amount.

6. The method of claim 1, wherein the predetermined reserve capacity is greater than zero.

7. The method of claim 5, wherein the threshold amount is a first threshold amount, the method further comprising determining whether the estimated used exchange capacity is less than the stored value by at least a second threshold amount, the second threshold amount being greater than the first threshold amount.

8. The method of claim 7, wherein the error message is a message indicating that a brine tank of the water softener system needs to be refilled with salt when the estimated used exchange capacity is less than the stored value by at least the first threshold amount but is not less than the stored value by at least the second threshold amount.

9. The method of claim 7, wherein the error message is a message indicating that a faulty regeneration has occurred when the estimated used exchange capacity is less than the stored value by at least the second threshold amount.

* * * * *